United States Patent
Takasuka

Patent Number: 6,142,663
Date of Patent: Nov. 7, 2000

[54] TEMPERATURE MEASURING METHOD FOR SEMICONDUCTOR WAFERS AND PROCESSING APPARATUS

[75] Inventor: Eiryo Takasuka, Imari, Japan

[73] Assignee: Sumitomo Metal Industries, Inc., Osaka, Japan

[21] Appl. No.: 09/234,368

[22] Filed: Jan. 21, 1999

[51] Int. Cl.[7] .............. G01K 7/00; G01K 11/32; G01J 5/08

[52] U.S. Cl. .............. 374/121; 374/137; 374/161; 374/166; 374/167

[58] Field of Search .................. 374/121, 122, 374/123, 124, 128, 137, 166, 167, 161

[56] References Cited

U.S. PATENT DOCUMENTS

| | | | |
|---|---|---|---|
| 5,098,198 | 3/1992 | Nulman et al. | 374/121 |
| 5,106,200 | 4/1992 | Hosokawa | 374/121 |
| 5,156,461 | 10/1992 | Moslehi et al. | 374/121 |
| 5,188,458 | 2/1993 | Thompson et al. | 374/121 |
| 5,225,883 | 7/1993 | Carter et al. | 374/124 |
| 5,249,142 | 9/1993 | Shirakawa et al. | 374/121 |
| 5,684,595 | 11/1997 | Kato et al. | 356/401 |
| 5,743,643 | 4/1998 | Gronet et al. | 374/121 |
| 5,782,974 | 7/1998 | Sorensen et al. | 374/121 |
| 5,841,110 | 11/1998 | Nenyei et al. | 374/121 |
| 5,848,842 | 12/1998 | Peuse et al. | 374/1 |
| 6,007,241 | 12/1999 | Yam et al. | 374/131 |

*Primary Examiner*—G. Bradley Bennett
*Assistant Examiner*—Gail Verbitsky
*Attorney, Agent, or Firm*—Breiner & Breiner

[57] ABSTRACT

This invention is intended to provide a semiconductor wafer temperature measuring method for use in reflector plate-equipped infrared annealing furnaces, infrared heating epitaxy furnaces, and other semiconductor wafer processing equipment that employs lamps as the heat source, the method affording easy and accurate measurement of substrate surface temperature, thereby enabling control of the heat source on the basis of these measurements. Characterizing features are the provision of a slit or small hole to the reflector plate and measuring light from the semiconductor wafer surface in the perpendicular direction by means of a scanning CCD sensor to allow substrate temperature to be measured on the basis of the radiant light distribution peak; and the provision of slits in a plurality of locations on the reflecting plate without impairing the function thereof, so that substrate temperature distribution can be measured accurately.

3 Claims, 7 Drawing Sheets

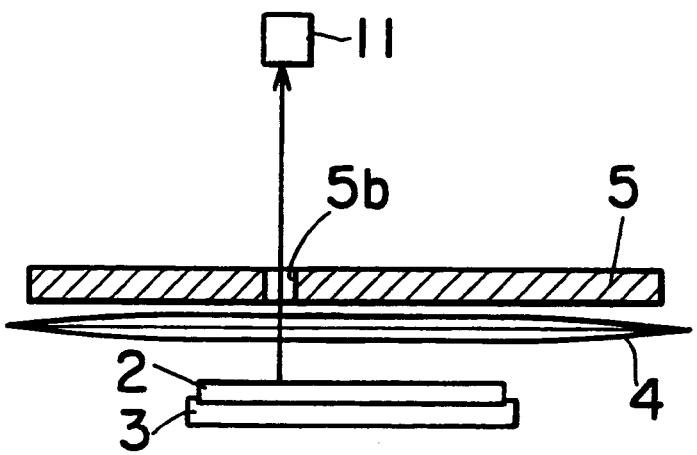
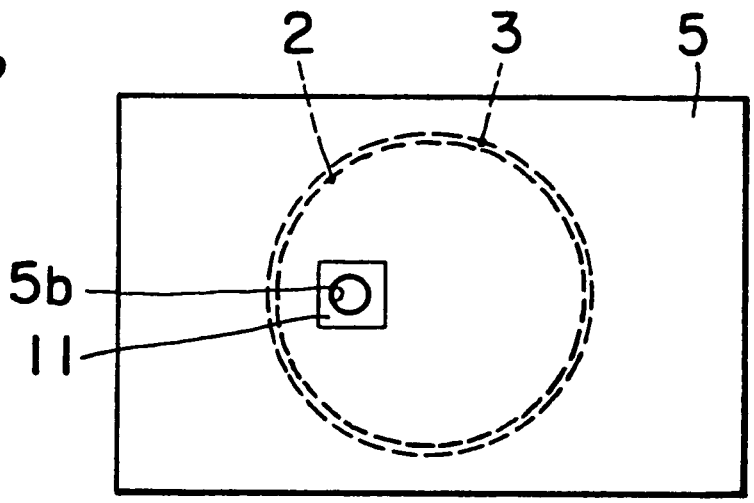

TEMPERATURE MEASURING METHOD FOR SEMICONDUCTOR WAFERS AND PROCESSING APPARATUS

FIELD OF THE INVENTION

This invention relates to a semiconductor wafer temperature measuring method for use in reflecting plate-equipped infrared annealing furnaces, infrared heating epitaxy furnaces, and other semiconductor wafer processing equipment that employs lamps as the heat source, the method being intended to provide easy and accurate measurement of substrate surface temperature and to enable control of the heat source on the basis of these measurements, and to a processing apparatus utilizing this method.

DESCRIPTION OF THE PRIOR ART

As an example of furnace design used in reflecting plate-equipped infrared annealing furnaces and infrared heating epitaxy furnaces, a known design is depicted in FIG. 9. A wafer 2 of semiconductor silicon or the like is introduced into a quartz chamber 1 and held therein on a susceptor 3. Depending on the process, the wafer 2 is transported through the chamber in the desired direction, or is again removed through the loading door once the process has been completed. Both the wafer 2 and the susceptor 3 are heated by infrared lamps 4 while the wafer is subjected to the desired process, such as heat treatment or vapor phase epitaxy.

The susceptor 3 and the infrared lamps 4 are disposed in a prescribed arrangement along the wall of the quartz chamber 1 such that the wafer 2 held within the quarts chamber 1 can be heated evenly. Reflector plates 5 and 6 are arranged in accordance with the infrared lamp 4 for the configuration in order to provide even heating and improve heating efficiency.

A furnace having the design described above can be employed as infrared annealing furnace by evacuating the quartz chamber 1 or bringing it to the desired atmosphere, and then heating by means of the infrared lamps 4 a wafer 2 being held on the susceptor 3. Alternatively, the furnace can be used as an infrared heating epitaxy furnace for conducting epitaxy on the top face of a wafer 2 held on the susceptor 3 by a process involving evacuation of the quartz chamber, backfilling with the desired gases, and heating by means of the infrared lamps 4 the wafer 2 being held on the susceptor 3.

The basic advantages offered by the furnaces described above, such as exceptionally even heating and heating efficiency, have led to widespread use. Improvements to infrared heating furnaces and epitaxy processes employing these furnaces have been proposed (Unexamined Patent Application (Kokai) 1-301589, Unexamined Patent Application (Kokai) 3-500185, Unexamined Patent Application (Kokai) 63-93378, and elsewhere) and are widely employed in heat treatments and epitaxy processes for silicon wafers and other semiconductor wafers.

A widely used method for measuring semiconductor wafer temperature in reflector plate-equipped infrared annealing furnaces, infrared heating epitaxy furnaces, and other processing equipment is an indirect temperature measuring technique which involves placing a temperature measurement ring 7 consisting of the same material as the susceptor 3 along the outside edge of the susceptor 4 and measuring the temperature of the ring 7 by means of a thermocouple 8 sealed within a quartz tube, or measuring the temperature of the back side of the susceptor 3 with an analogous thermocouple 9 sealed within a quartz tube, and estimating the semiconductor wafer temperature (see FIG. 9).

The increasing fine patterning required to produce today's integrated circuits has made it necessary to improve the cleanliness and properties of silicon wafers and other semiconductor wafers. In the area of deposited epitaxial layer of silicon wafers, there is an urgent need to control slip dislocations, achieve uniform film thickness, and otherwise improve film morphology.

Improving uniform heating precision is an indispensable requirement for improving quality in epitaxial layers. In terms of achieving uniform heating, it is extremely important to control an output by the plurality of infrared lamps that serve as the heat source. This in turn requires accurate monitoring of temperature distribution in the semiconductor wafer being processed, since this serves as the basis for control of the heat source. A drawback of indirect measuring techniques employing thermocouples, the goal of which is to avoid contaminating the interior of the quartz chamber, is that it is difficult to ascertain with precision the temperature distribution on the semiconductor wafer surface, making it impossible to properly control infrared lamp output so as to produce uniform heating.

SUMMARY OF THE INVENTION

In light of the aforementioned drawbacks pertaining to reflector plate-equipped infrared annealing furnaces, infrared heating epitaxy furnaces, and other semiconductor wafer processing equipment that employs infrared lamps as the heat source, an object of this invention is to provide a semiconductor wafer temperature measuring method affording easy and accurate measurement of substrate surface temperature, thereby enabling control of the heat source on the basis of these measurements, and to a processing apparatus utilizing this method.

As a result of extensive research conducted with the object of a method that would afford easy and accurate measurement of substrate surface temperature in semiconductor wafer processing equipment that employs lamps as the heat source, the inventors discovered that temperature distribution on a substrate can be measured accurately by means of providing the reflector plates with slits or small holes, measuring light from the semiconductor wafer surface in the perpendicular direction using a scanning CCD sensor (hereinafter called "CCD charged coupled device"), and computing substrate temperature on the basis of the peak value in the radiant light distribution, providing slits in several locations such that reflecting plate function is not impaired. The present invention was perfected on the basis of this discovery.

The inventors further discovered that optimal embodiment of the method of the invention is achieved in an ordinary semiconductor wafer processing unit of the type described above through a design enabling installation at the semiconductor wafer processing end of a reflecting plate having a slit or small hole, providing a measuring device comprising a CCD unit capable of measuring in the perpendicular direction light from the semiconductor wafer surface and a computing device for computing substrate temperature on the basis of the radiant light distribution peak value in the radiant light intensity distribution in the perpendicular direction, and further providing control means for controlling lamp power through feedback control or other process on the basis of temperature measurements made by the measuring system.

The semiconductor wafer temperature measuring method which pertains to the present invention affords easy and accurate measurement of substrate surface temperature in reflector plate-equipped infrared annealing furnaces, infrared heating epitaxy furnaces, and other semiconductor wafer processing equipment that employs lamps as the heat source, making it possible to control heat source output on the basis of these measurements, thereby improving the uniformity of heating of substrate surfaces and greatly improving the precision of heat treatment and epitaxy processes.

BRIEF DESCRIPTION OF THE DRAWINGS

FIG. 3A is a longitudinal section illustrating the basic principle of another semiconductor wafer temperature measuring technique of the invention, depicting positional relationships among the substrate, reflector plate, and CCD;

FIG. 3B is a plan illustration of A;

DETAILED DESCRIPTION OF THE PREFERRED EMBODIMENTS

Figure 1A:
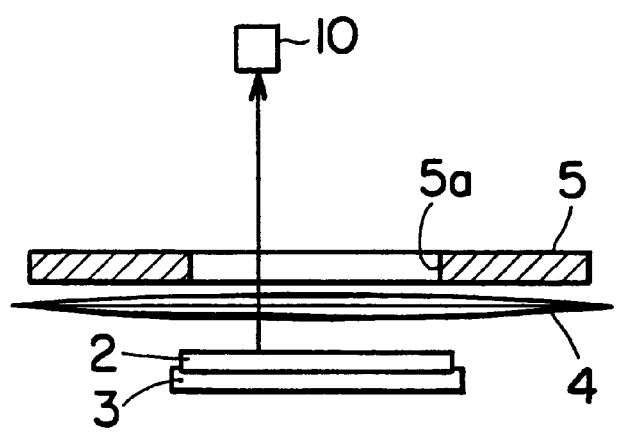
FIG. 1A is a longitudinal section illustrating the basic principle of a semiconductor wafer temperature measuring technique of the invention, depicting positional relationships among the substrate, reflector plate, and CCD.
Figure 1B:
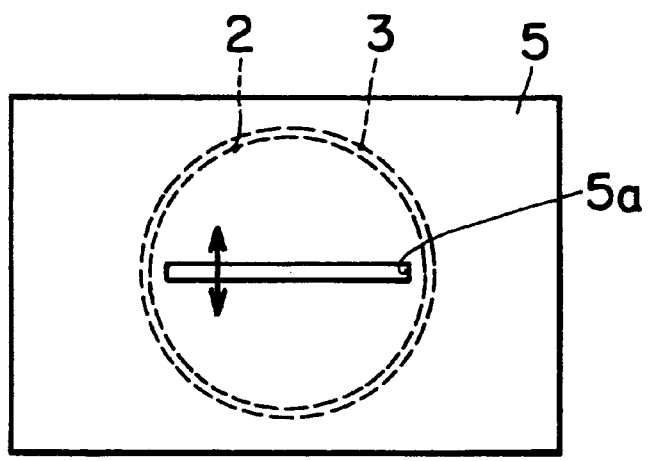
FIG. 1B is a plan illustration of A.

The basic principle of the semiconductor wafer temperature measuring technique of this invention will be illustrated with reference to the accompanying drawings. The quartz chamber of the furnace depicted in FIG. 9 has been omitted from the drawings referred to below, and the lamps have also been omitted so that only relationships among the top face of the wafer 2 held on the susceptor 3, the reflector plate, and the CCD are shown. Referring now to FIG. 1, a slit 5a of prescribed dimensions is provided to the reflector plate 5 located above a prescribed location on the top face of the wafer 2. A scan performed by a one-dimensional CCD 10 perpendicular to the substrate face through the slit 5a gives a signal like that depicted in FIG. 2.

Figure 2:
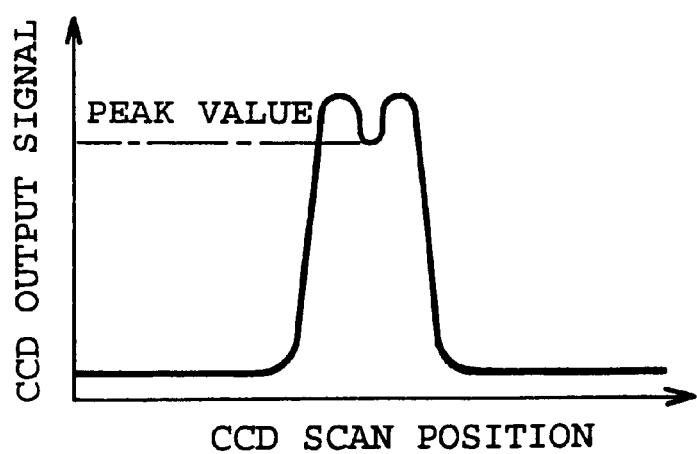
FIG. 2 is a graph depicting the relationship between the CCD scanning position and the CCD output signal.

By attributing the peak value in the CCD signal depicted in FIG. 2 to heat radiation from the substrate, it is possible to eliminate the effect of scattered light from the infrared lamps, allowing heat radiation from the substrate to be measured accurately so that accurate measurements of substrate temperature can be made.

Referring to FIG. 3, a small hole 5b of prescribed dimensions is provided to the reflector plates 5 positioned above a prescribed location on the top face of the wafer 2, and a scan is conducted by a two-dimensional CCD 11 through the small hole 5b to measure the two-dimensional distribution in the area which includes the small hole. By attributing the peak value in this area to heat radiation from the substrate, it is possible to exclusively measure heat radiation perpendicular to the wafer and to eliminate the effect of scattered light from the infrared lamps. Thus, heat radiation from the substrate can be measured accurately, making possible accurate measurements of substrate temperature.

In the temperature measuring systems depicted in FIGS. 1 and 3, by measuring temperature at a plurality of measuring points and using these measurements to conduct zone control through control of power source lamp power, it is possible to control the temperature distribution over the entire substrate to uniform levels, to reduce the incidence of slips, and to improve the precision of deposition.

Figure 4A:
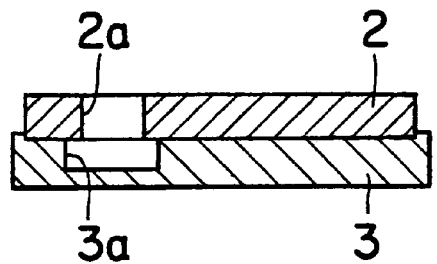
FIG. 4A is a longitudinal section depicting the substrate and susceptor in a correction method employed in the temperature measuring technique of the invention.
Figure 4B:
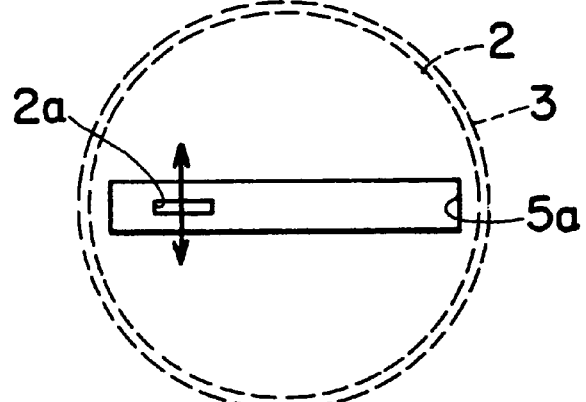
FIG. 4B is a plan illustration of A.
Figure 5:
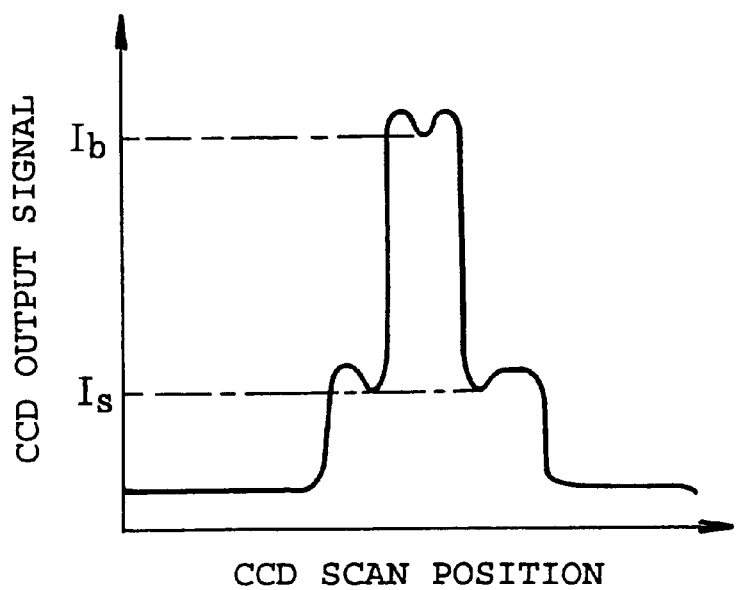
FIG. 5 is a graph depicting the relationship between the CCD scanning position and the CCD output signal.

In the temperature measuring system depicted in FIG. 1, the wafer 2 is provided with a slit 2a and the opaque susceptor 3 is provided with a groove 3a having a depth equal to or more than twice the width of the slit 2a (FIG. 4). These are arranged parallel to the slit 5a of the reflector plate 5 and measured by a one-dimensional CCD to give measurements $I_s$ and $I_b$ of radiation intensity from the surface of the wafer 2 and from the groove 3a (FIG. 5). The ratio of radiant light intensity $I_s$ from the wafer 2 face and radiant light intensity $I_b$ from the groove 3a measured by the one-dimensional CCD is designated as the effective emissivity $\epsilon_{eff}(=I_s/I_b)$ of the measuring system; this can be used to accurately determine an effective emissivity characteristic to the system configuration, affording accurate temperature measurements.

Figure 6A:
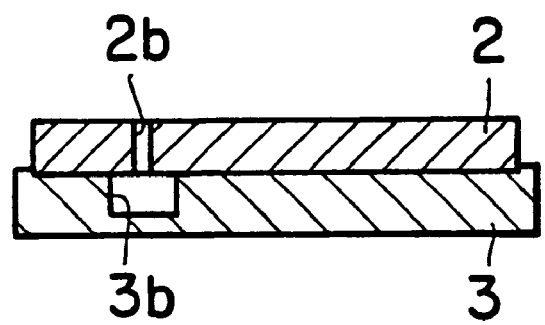
FIG. 6A is a longitudinal section depicting the substrate and susceptor in another correction method employed in the temperature measuring technique of the invention.
Figure 6B:
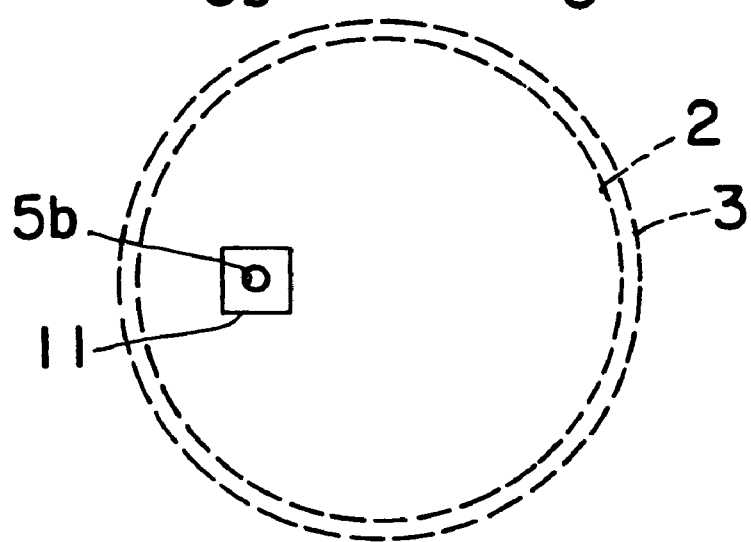
FIG. 6B is a plan illustration of A.
Figure 7:
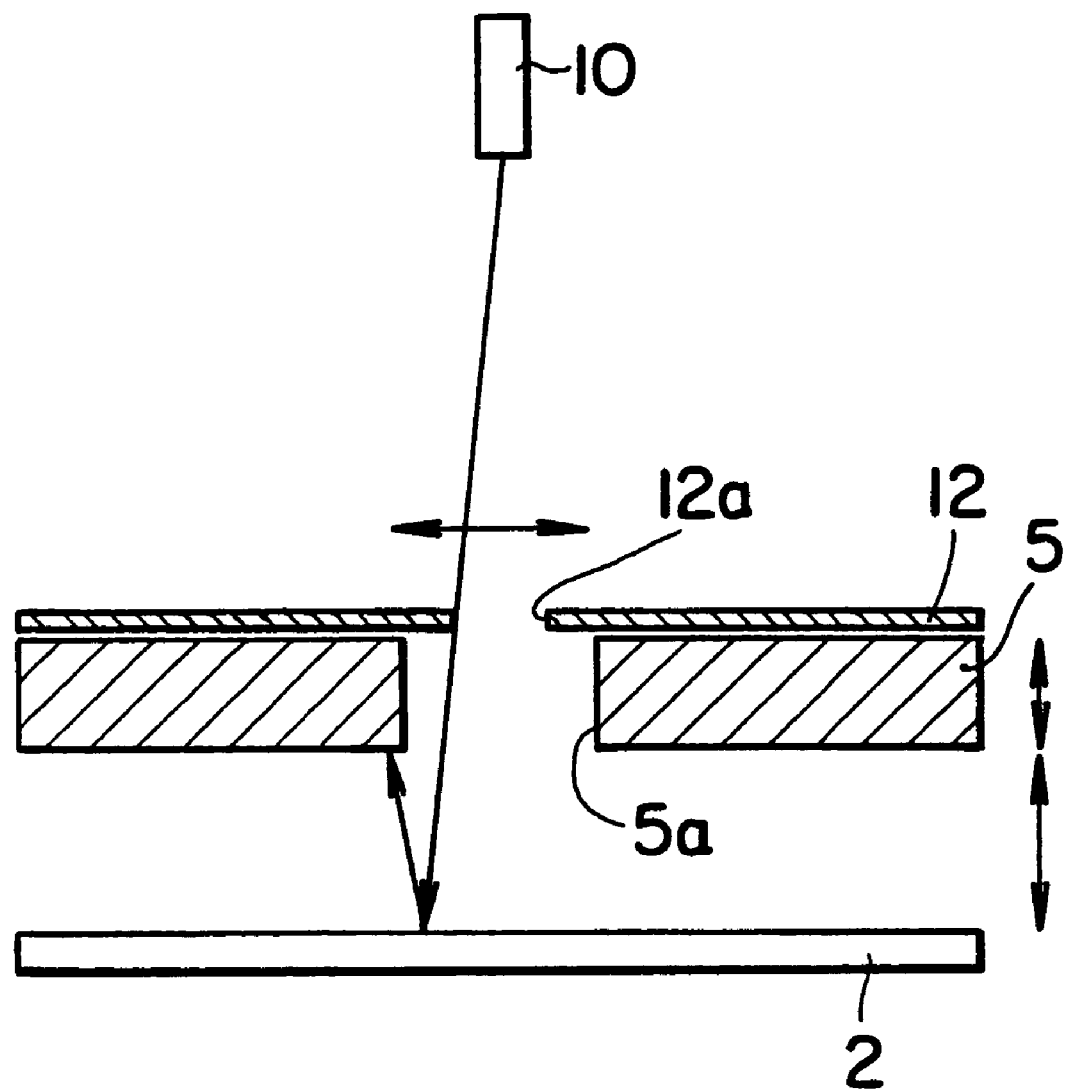
FIG. 7 is a longitudinal section depicting positional relationships among the slit, substrate, reflector plate, and CCD in an embodiment of the temperature measuring technique of the invention.

In the temperature measuring system depicted in FIG. 3, the wafer 2 is provided with a small hole 2b and the opaque susceptor 3 is provided with a small hole 3b having a depth equal to or more than twice the diameter of the small hole 2b (FIG. 6). These are arranged parallel to the small hole 5b of the reflector plate 5 and measured by a two-dimensional CCD to give measurements of radiant intensity $I_s$ and $I_b$ from the wafer 2 surface and the small hole 2b analogously to FIG. 5. The ratio of radiant light intensity $I_s$ from the wafer 2 face and radiant light intensity $I_b$ from the groove measured by the two-dimensional CCD is designated as the effective emissivity $\epsilon_{eff}(=I_s/I_b)$ of the measuring system; this can be used to accurately determine an effective emissivity characteristic to each device, affording accurate temperature measurements.

To summarize, according to the semiconductor wafer temperature measuring method which pertains to the present invention, the semiconductor wafer is provided with a slit or small hole, and the opaque substrate holding plate (susceptor) is provided with a groove having a depth equal to or more than twice the width of the slit, or with a small hole having a depth equal to or more than twice the diameter of the small hole. These openings are arranged parallel to a slit in the lamp reflector plate or concentrically with a small hole provided thereto, and the ratio of radiant light intensity from the substrate face and the radiant light intensity from the groove or small hole measured by the one-dimensional or the two-dimensional CCD is designated as the effective emissivity for the measuring system, which can be used to make corrections.

As regards correction, the effective emissivity characteristic of a CCD device does not undergo substrate-induced changes provided that qualities remain the same; however, electrical signal shift in the CCD device and infrared absorption coefficient of the quartz chamber do change with continued processing, making it necessary to recalibrate the effective emissivity at suitable intervals.

According to the temperature measuring system of the present invention, the reflecting plate is provided with a narrow slit or small-diameter hole, and the CCD is used to conduct a scan therethrough perpendicular to the substrate face. For a slit, the CCD used for this purpose can be either one-dimensional or two-dimensional; for a small hole, a two-dimensional CCD is used. In preferred practice, the one-dimensional or two-dimensional CCD has a design provided with an optical system comprising a suitably arranged lens, slit, etc., so that radiant light from a designated location on the measured object can be condensed into a prescribed CCD image.

Figure 9:
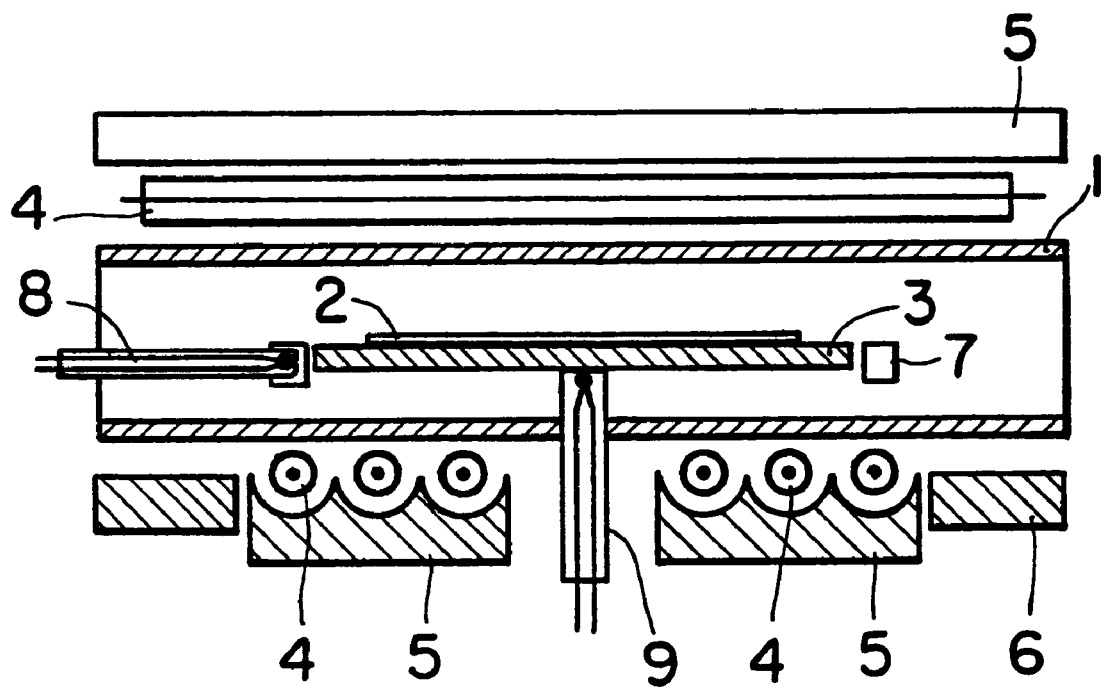
FIG. 9 is a longitudinal section depicting an example of furnace design in a reflector plate-equipped infrared annealing furnace or infrared heating epitaxy furnace of the prior art.

The temperature measuring method which pertains to the present invention depicted in FIG. 1 was implemented in an infrared heating epitaxy furnace having the design depicted in FIG. 9. A plurality of slits were provided to the reflector plate to provide a plurality of measuring points, and the substrate surface temperature measurements at these points were used as the basis for introducing zone control to lamp power control in order to produce a uniform temperature distribution over the entire substrate. The furnace was equipped with a measuring device in accordance with the present invention comprising a computing device for determining substrate temperature on the basis of radiant light distribution peak values in the radiant light intensity distribution in the perpendicular direction, and with control means for controlling lamp power through feedback control or feedforward control on the basis of the temperature measurements provided by the measuring system.

In the furnace, the distance between the wafer 2 and the reflecting plate 5 was 50 mm; the thickness of the reflecting plate 5 was 10 mm, and it was provided with a slit 5a of prescribed width. Since the scattered light from the lamp is reaching the outside of the reflector plate 5; a black plate 12 that reflects virtually no light was set to the reflecting plate 5, and a slit 12a narrower than the slit 5a in the reflecting plate 5 was made in the black plate 12 to reduce the scattered light. Light from the semiconductor wafer 2 surface was measured through the slit from the perpendicular direction using a one-dimensional CCD 10.

Figure 8:
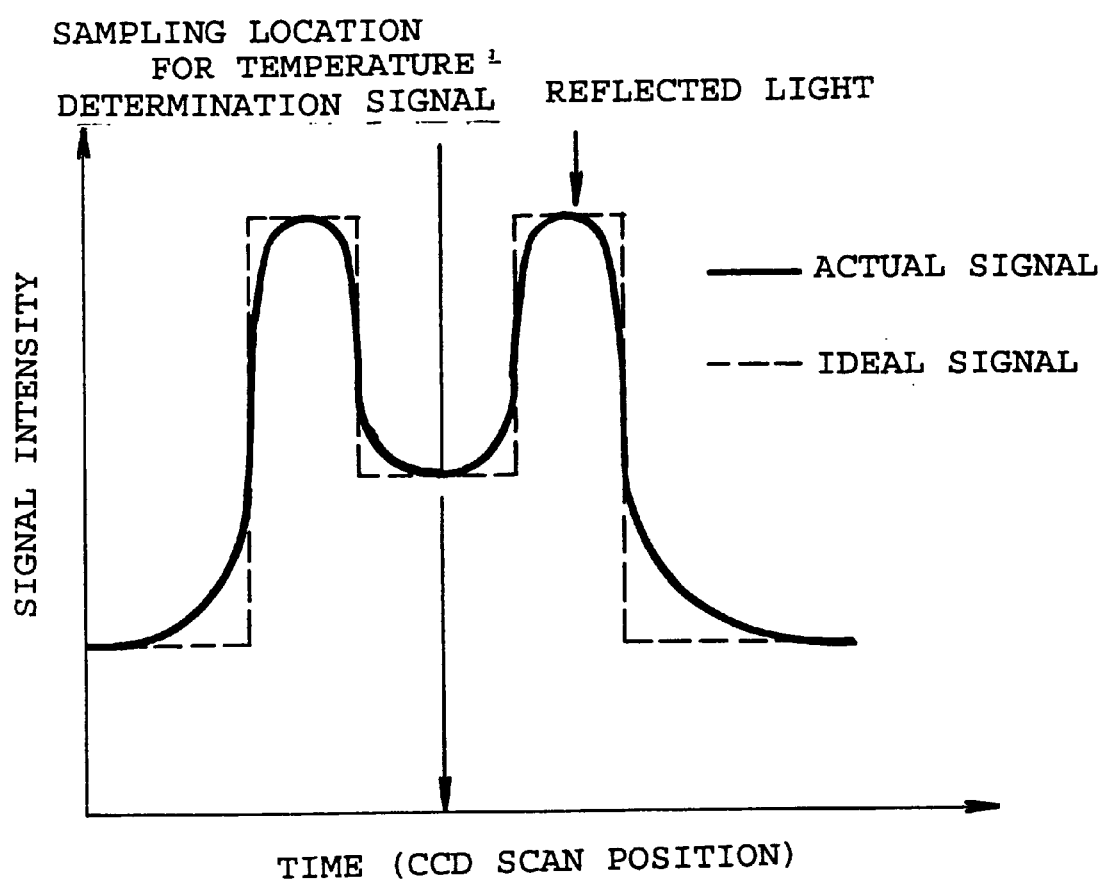
FIG. 8 is a graph depicting the relationship between the CCD scanning position and the CCD output signal in the embodiment.

The obtained measurements followed the intensity distribution depicted by the solid line in FIG. 8. The intensity distribution depicted by the broken line represents an ideal signal that would be obtained if signal deterioration due to sensor or camera lens resolution were ignored. The "shoulders" of the signal distribution shown in the drawing are produced by scattered light reflected by the plate and from the substrate with its superposition on the heat radiation from the substrate itself. This superposition occurs when the incident angle of the CCD deviates from 90° C. The dip on the peak represents signal intensity produced exclusively by heat radiation from the substrate; accordingly, signal intensity in this dip is employed as the signal intensity for determining substrate temperature.

Although scattered lamp light is reflected at various locations, the black plate 12 has been provided with a slit 12a narrower than the slit 5a in the reflector plate 5, thereby suppressing signals other than the two signals described above and facilitating signal processing.

The width of the slit 5a must be large enough to adequately depress shoulder segment intensity in FIG. 8 and increase substrate radiation intensity of the dip. For a one-dimensional CCD, required slit width is 4 mm or greater for a 1.5 m measuring distance. The minimum value for slit width decreases with shorter measuring distances, and this is useful in terms of maintaining the inherent reflection efficiency of the reflecting plate. For a measuring distance of 1 m, minimum slit width was 3 mm, and for a measuring distance of 2 m, it was 5.5 mm.

The substrate surface temperature distribution achieved in an infrared heating epitaxy furnace embodying the substrate temperature measuring method in accordance with this invention was greatly improved relative to that achieved under temperature control using the conventional thermocouple depicted in FIG. 9, and the frequency of slips was reduced by 90% or more.

What is claimed is:

1. A semiconductor wafer temperature measuring method, comprising the steps of:

in a process furnace in which a semiconductor wafer is heated by means of lamps, providing a slit or small hole to a reflector plate for the lamp light;

measuring therethrough light from the semiconductor wafer in the perpendicular direction by means of a scanning charged coupled device sensor; and determining substrate temperature on the basis of the radiant light distribution peak in the thusly measured radiant light intensity distribution perpendicular to the wafer.

2. The semiconductor wafer temperature measuring method according to claim 1, wherein a slit or small hole is made in the semiconductor wafer; a groove having a depth equal to or more than twice the width of the slit or a small hole having a depth equal to or more than twice the diameter of the small hole is provided to an opaque substrate support stage, arranged parallel to the slit in the lamp light reflector plate or with its center aligned with the center of the hole in the lamp light reflector plate;

and the ratio of radiant light intensity from the substrate surface and radiant light intensity from the groove is designated as the effective emissivity for the measuring system in performing corrections.

3. A semiconductor wafer processing apparatus, comprising:

a processing furnace in which the semiconductor wafer is heated with lamps, designed to enable installation at the semiconductor wafer processing end of a reflecting plate having a slit or small hole;

a measuring device comprising a charged coupled device unit capable of measuring in the perpendicular direction light from the semiconductor wafer surface and a computing device for computing substrate temperature on the basis of the radiant light distribution peak value in the radiant light intensity distribution in the perpendicular direction; and control means for controlling lamp power through feedback control or other process on the basis of temperature measurements made by the measuring device.

* * * * *